United States Patent Office 3,112,330
Patented Nov. 26, 1963

3,112,330
PROCESS FOR THE PREPARATION OF 9-OXODEC-2-ENOIC ACID AND ESTERS THEREOF
John Francis Oughton, Gerrards Cross, England, assignor to Glaxo Group Limited, Greenford, England, a British company
No Drawing. Filed Sept. 13, 1961, Ser. No. 137,751
Claims priority, application Great Britain Sept. 27, 1960
10 Claims. (Cl. 260—410.9)

The present invention is concerned with the synthesis of 9-oxodec-2-enoic acid (trans) and more particularly with the preparation of a new intermediate of use in such synthesis.

It has been shown that queen honeybees produce a substance which has been termed "queen substance" and which has the effect of inhibiting queen cell formation apparently by inhibiting the development of ovaries in workers. This activity is of interest in the apiary in that such material could be used to control swarming and to assist the introduction of virgin or mated queen honeybees into colonies with or without a queen.

Callow and Johnston (Bee World 41 (6), 152, 153 (1960)), have reported that the active principle of queen substance appears to be the compound 9-oxodec-2-enoic acid. The esters of 9-oxodec-2-enoic acid are reported to possess similar physiological activity.

A synthesis of 9-oxodec-2-enoic acid (trans) has been achieved by Callow et al. starting from castor oil but this process is somewhat lengthy and low in yield and it is an object of the present invention to provide an improved synthesis of 9-oxodec-2-enoic acid (trans). This compound on synthesis apparently exerts identical physiological activity to that of natural queen substance.

The present invention is based upon the use as intermediate of 7-oxo-octan-1-ol.

In accordance with the invention 7-oxo-octan-1-ol is converted into 7-oxo-octanoic aldehyde by oxidation under conditions serving to oxidise a hydroxymethylene grouping to an aldehyde grouping, care being taken to avoid as far as possible further oxidation to the acid. Suitable conditions include Oppenauer oxidation conditions, chromium trioxide in, for example, pyridine etc. The use of dichromate and mineral or organic acid is preferred, potassium dichromate being the reagent of choice, advantageously in the presence of an aliphatic acid such as acetic acid.

7-oxo-octanoic aldehyde may then be converted to 9-oxodec-2-enoic acid (trans) or its esters by reaction with malonic acid or an ester thereof under basic conditions the resulting product being decarboxylated, if required, before or after hydrolysis of unwanted ester groups. Advantageously, the 7-oxo-octanoic aldehyde is reacted with unesterified malonic acid under basic conditions, the decarboxylation taking place spontaneously or on warming to yield unesterified 9-oxo-dec-2-enoic acid (trans). The basic conditions for the reaction are conveniently achieved by including in the reaction mixture an organic base, for example a tertiary organic base e.g. pyridine, N-methylmorpholine, quinoline, dimethylaniline, triethylamine, collidine etc., or a secondary organic base such as piperidine.

7-oxo-octan-1-ol may be prepared advantageously according to a still further feature of the invention by reacting an acetoacetic ester with a 5-halopentanol ester, e.g. the acetate, under alkaline conditions. An alkali metal derivative, e.g. the sodium derivative of an acetoacetic ester such as ethyl acetoacetate is preferably used. The halo-pentanol ester is advantageously a 5-bromopentanol ester, preferably the acetate. The reaction is advantageously effected in an inert solvent medium, e.g. an alkanol such as ethanol, methanol etc. The reaction product may then be subjected to ketonic hydrolysis, for example, by stirring with dilute aqueous alkali, e.g. with sodium or potassium hydroxide and the product then decarboxylated, for example by heating with mineral acid, e.g. sulphuric, hydrochloric, phosphoric acid etc.

The 5-halo-pentan-1-ol ester may be prepared, advantageously by reacting an acyl halide with tetrahydropyran preferably in the presence of a catalyst such as zinc dust or zinc chloride. Thus, for example, tetrahydropyran may be reacted with acetyl bromide to yield 5-bromopentanol acetate.

For the better understanding of the invention the following examples are given only as illustrations:

EXAMPLE 1

(a) Preparation of 5-Bromoamyl Acetate

Acetyl bromide (15.2 ml., 25.3 g., 0.206 mole) was added slowly to a mixture of tetrahydropyran (20 ml., 17.1 g., 0.20 mole) and zinc dust (0.08 g.) with stirring. The temperature rose from 20° C. to 35° C. and the mixture was then heated on the steam bath. At 80° C. an exothermic reaction began, and the temperature began to fall (ca. 5 mins. with cooling). The mixture was again heated on the steam bath for 20 mins. It was then cooled and poured into a mixture of water (30 ml.) and methylene chloride (30 ml.). After shaking the mixture, the phases were separated and the organic phase was washed with saturated aqueous sodium bicarbonate (30 ml.) and water (30 ml.), back-extracting with dichloromethane (20 ml.). The solvent was evaporated off the combined extracts and the residue distilled at 17 mm. The fraction boiling at 112–113° C. was collected, yielding 5-bromoamyl acetate (31.5 g., 75.6%), $n_D^{20}$ 1.4610.

(b) Preparation of Octan-1-Ol-7-One

Ethyl acetoacetate (12.7 ml., 13.0 g., 0.10 mole) was added rapidly with stirring to a hot freshly prepared solution of sodium (2.3 g., 0.10 mole) in absolute ethanol (60 ml.). 5-bromoamyl acetate (20 g., 0.096 mole) was then added slowly (10 mins.) to the stirred, refluxing solution, and stirring and refluxing was continued for a further 4 hrs. The solution was then cooled, the precipitated sodium bromide filtered off and washed with ethanol (10 ml.) and the combined filtrate and washings gently heated under reduced pressure until most of the ethanol was removed. A 5% aqueous solution of sodium hydroxide (200 ml., 0.25 mole) was added and the mixture stirred at room temperature for 16 hrs. It was then shaken with dichloromethane (10 ml.) to remove any unsaponified ester and the dichloromethane discarded. To the aqueous solution was added 50% aqueous sulphuric acid (20 ml., 0.19 mole) with stirring, and the solution was then heated under reflux until decarboxylation was complete (1 hr.). It was cooled and poured into dichloromethane (50 ml.), shaken, separated and the aqueous phase again extracted with dichloromethane (50 ml.). The organic solutions were combined and washed with water (50 ml.), saturated aqueous sodium bicarbonate (50 ml.) and water (50 ml.), back-extracting with dichloromethane (25 ml.). After removing the solvent under reduced pressure on the steam bath the residue was distilled and the fraction distilling at 95.5–100°/0.5 mm. was collected, yielding octan-1-ol-7-one (7.86 g., 57%), $n_D^{20}$ 1.4460.

(c) Preparation of Octan-1-Al-7-One

A solution of octan-1-ol-7-one (1 ml.), potassium dichromate (1 g.) and concentrated sulphuric acid (1 ml.) in a mixture of water (25 ml.) and acetone (5 ml.) was heated with intermittent agitation at 50° C. for 30 mins. The excess dichromate was reduced by the addition of solid sodium metabisulphite (ca. 1 g.) and the solution poured into a mixture of dichloromethane (20 ml.) and water (20 ml.). The aqueous phase was separated and extracted with dichloromethane (10 ml.) and the combined solutions washed with water (10 ml.). The dichloromethane was removed under reduced pressure to leave ca. 0.7 ml. liquid residue which gave a positive test for carbonyl group with 2,4-dinitrophenyl-hydrazine hydrochloride and for aldehyde with ammoniacal silver nitrate solution and Schiff's reagent, and had $n_D^{20}$ 1.4495. Infra red showed the presence of ca. 40% aldehyde and a large proportion of carboxylic acid. The crude product was dissolved in dichloromethane (10 ml.) and shaken with saturated aqueous sodium bicarbonate (10 ml.) and water (10 ml.), backwashing with dichloromethane (5 ml.). On removing the solvent a small amount of pale yellow liquid remained, having $n_D^{20}$ 1.4506 and containing, according to infra red evidence, ca. 70% of the same aldehyde as had been prepared by ozonolysis of 1-methyl cycloheptene, i.e. octan-1-al-7-one.

(d) *9-Oxodec-2-Enoic Acid*

Octan-1-al-7-one (25.2 g., 0.177 mole, prepared as in (c)) was added to a solution of malonic acid (20.3 g., 0.195 mole, 1.1 equivs.) in pyridine (102 ml.) and the mixture heated at 35–40° C. with stirring for 3¾ hrs. The temperature was then raised to 100° C. for 3 hours and the mixture allowed to cool. After 16 hrs. at room temperature it was poured into 2 N-hydrochloric acid (750 ml.) and the solution extracted with dichloromethane (2 x 500 ml.). These extracts were combined, washed with water (400 ml.), the water backwashed with dichloromethane (200 ml.) and the total dichloromethane solutions extracted with 8% aqueous sodium bicarbonate (2 x 400 ml.). After washing the alkaline solution with dichloromethane (200 ml.) it was acidified with concentrated hydrochloric acid (80 ml.) and extracted with dichloromethane (2 x 200 ml.). These extracts were washed with water and the solvent evaporated under reduced pressure to leave a brown oil, which solidified on standing to crystals of 9-oxodec-2-enoic acid. These were stirred in ethyl acetate with charcoal (5 g.) for 30 minutes at room temperature, the filtered solution evaporated to ca. 20 ml. and 40–60° C. petrol (ca. 50 ml.) added. On cooling the clear solution in ethanol/solid $CO_2$ mixture, white crystals were precipitated, and were filtered off and dried in vacuo at room temperature over silica gel, yielding 6.22 g. (19.2%) of 9-oxodec-2-enoic acid, M.P. 37–50°. After recrystallisation from ethyl acetate-petrol the M.P. was raised to 41–49° C. (Found: C, 65.01; H, 8.69; $C_{10}H_{16}O_3$ requires C, 65.19; H, 8.76%.)

EXAMPLE 2

(a) *5-Bromoamyl Acetate*

A suspension of zinc dust (0.12 g.) in tetrahydropyran (25 g., 28.4 ml.; 86–87.5° C.) at 80° C. was vigorously stirred while acetyl bromide (22.6 ml.; 37.5 g.; 1.05 equiv.) was added slowly (12 mins.) so that the reaction temperature remained between 90° C. and 95° C. After the addition of the acetyl bromide the reaction temperature was held at 95° C. to 100° C. for a further 25 minutes. The cooled reaction solution was poured into water (50 ml.) and the crude product was extracted into dichloromethane (3 x 30 ml.), washed with 8% sodium hydrogen carbonate (30 ml.) and water (30 ml.) and the aqueous washes were back-extracted with dichloromethane (7 ml.). The combined extracts were concentrated at atmospheric pressure and the residue slowly distilled in vacuo (10" Vigreux column). The bromoamyl acetate (52.5 g.; 86.5%) distilled at 99–110° C./12 mm., $n_D^{20}$ 1.4620.

(b) *Octan-1-Ol-7-One*

Ethyl acetoacetate (207 ml., 211 g., 1.62 moles) was added rapidly to a stirred, hot solution of sodium (37.4 g., 1.62 moles) in absolute alcohol (900 ml.). 5-bromoamyl acetate (325 g., 1.55 moles) was added during 15 minutes to the stirred refluxing solution and was washed in with absolute alcohol (65 ml.). (A precipitate formed soon after the addition was complete.) The reaction mixture was stirred under reflux for 4 hours and then cooled to 20°. The precipitate was filtered off and washed with industrial methylated spirit (2 x 70 ml.) and the filtrate was concentrated in vacuo keeping the temperature of the solution below 30° C. The residual yellow oil was stirred for 16 hours at room temperature (ca. 20° C.) with a 5% solution of sodium hydroxide in water (3.25 l., 4.06 moles). The clear aqueous solution was extracted with dichloromethane (150 ml.) to remove any unsaponified material, acidified with concentrated sulphuric acid (162.5 ml., 2.9 moles) in water (162.5 ml.) and heated on a steam bath for 2 hours. The resultant clear solution was cooled, and extracted with dichloromethane (5 x 350 ml.). The first four extracts were combined and washed with water (750 ml.), 8% sodium hydrogen carbonate solution (2 x 375 ml.), water (375 ml.) and the aqueous washes were back-extracted with the last dichloromethane extract. The dichloromethane was distilled off and the residual oil ($n_D^{20}$ 1.4450) was fractionally distilled through a 10" Vigreux column. The first runnings, B.P. <87.5° C./0.4 mm., $n_D^{20}$ 1.4490 to 1.4470 (10.6 g.), were discarded and the fraction with B.P. 87.5° C. to 95°/0.4 mm., $n_D^{20}$ 1.4470–1.4475, M.P. 12° C. (146.5 g., 65.4%), was collected and used in the next stage.

(c) *Octan-1-Al-7-One*

Octan-1-ol-7-one (86 g.) and powdered potassium dichromate (75.8 g., 1.3 equivs.) in glacial acetic acid (946 ml. were stirred at 85–90° C. for one hour. The green reaction solution was cooled, diluted with water (4.3 l.) and extracted with dichloromethane (5 x 500 ml.). The first four extracts were combined, washed with water (1 l.), 8% sodium hydrogen carbonate (500 ml.), water (500 ml.) and the aqueous layers were back-extracted with the last dichloromethane extract. The combined extracts were concentrated keeping the temperature of the residual oil below 40° C. at 14 mm. (69 g., 81.5%), $n_D^{20}$ 1.4468. Infra-red indicated approximately 80% octan-1-al-7one. This material was used without purification in the next stage. Octan-1-al-7-one should be stored under nitrogen in a stoppered flask to prevent aerial oxidation.

(d) *9-Oxodec-2-enoic acid*

Octan-1-al-7-one (20 g.) was added to a solution of malonic acid (21.7 g., 1.5 equiv.) in pyridine (17.25 ml., 1.5 equiv.) containing piperidine (1 ml.) and the temperature of the solution was maintained at 30° C. for 20 hours. The reaction mixture was then heated on a steam bath for 4 hours, cooled and then worked up as before.

The crude product (14.27 g., 55%) was stirred with charcoal (S.S. 5, 3.4 g.) in ethyl acetate (125 ml.) at 30° C. for 30 minutes and then crystallised from a mixture of ethyl acetate (33 ml.) and petroleum ether (40–60, 33 ml.) at −25 to −28°, collected by filtration and washed with 30% ethyl acetate/petrol (10 ml.) at −30° C., petroleum ether (40–60, 30 ml.) and dried to give the 9-oxodec-2-enoic acid (9.8 g., 37.8%), M.P. 54–57° C.

A second crop of product (1.23 g., M.P. (42) 46–51°) was obtained by cooling the mother liquors (excluding the final petrol wash) to −70° C. with stirring. This material was recrystallised from a mixture of ethyl acetate (4 ml.) and petroleum ether (4 ml.) cooled to −25° C. to give off-white crystals of the required product (0.68 g., 2.6%) with M.P. 54–56° C.

I claim:

1. A process for the preparation of a compound selected from the group consisting of 9-oxodec-2-enoic acid and an ester thereof comprising the steps of oxidizing 7-oxo-octan-1-ol to produce octan-1-al-7-one and condensing said last-mentioned compound under basic conditions with an ester of malonic acid, and hydrolyzing and dicarboxylating the resulting product.

2. A process for the preparation of 9-oxodec-2-enoic acid comprising the steps of oxidizing 7-oxo-octan-1-ol to produce octan-1-al-7-one and condensing said last-mentioned compound under basic conditions with malonic acid to produce said 9-oxodec-2-enoic acid upon decarboxylation.

3. A process as claimed in claim 2 in which the decarboxylation is completed by heating.

4. A process as claimed in claim 2 in which the oxidation is effected with a dichromate and an aliphatic acid.

5. A process as claimed in claim 4 in which the acid is glacial acetic acid.

6. A process as claimed in claim 2 in which the basic conditions are achieved by addition of a substance selected from the group consisting of a secondary organic base and a tertiary organic base.

7. A process as claimed in claim 2 in which 7-oxo-octan-1-ol is prepared by reacting a halopentan-1-ol ester with an acetoacetic acid ester under alkaline conditions, the resulting condensation product being subjected to ketonic hydrolysis and decarboxylation.

8. A process as claimed in claim 7 in which the halopentanol ester is 5-bromo-pentan-1-ol acetate.

9. A process as claimed in claim 7 in which the 5-halopentanol ester is prepared by reaction of tetrahydropyran with an acyl halide.

10. A process as claimed in claim 9 in which the reaction with tetrahydropyran is effected in the presence of a substance selected from the group consisting of zinc dust and zinc chloride.

References Cited in the file of this patent

Fieser et al.: "Organic Chemistry," 3rd edition, Reinhold Publishing Corporation, New York, 1956, pages 193, 218 to 229 and 692. (Copy in Div. 63.)

Chemical Abstracts, volume 43, page 6190g, 1949.